(12) United States Patent
Broadfield

(10) Patent No.: US 10,801,922 B2
(45) Date of Patent: Oct. 13, 2020

(54) WHEEL SENSOR COOLING

(71) Applicant: Wheely-Safe Ltd., Staffordshire (GB)

(72) Inventor: Gary Broadfield, Staffordshire (GB)

(73) Assignee: Wheely-Safe Ltd., Staffordshire (GB)

( * ) Notice: Subject to any disclaimer, the term of this patent is extended or adjusted under 35 U.S.C. 154(b) by 250 days.

(21) Appl. No.: 15/772,506

(22) PCT Filed: Oct. 31, 2016

(86) PCT No.: PCT/GB2016/053382
§ 371 (c)(1),
(2) Date: Apr. 30, 2018

(87) PCT Pub. No.: WO2017/072538
PCT Pub. Date: May 4, 2017

(65) Prior Publication Data
US 2019/0078979 A1   Mar. 14, 2019

(30) Foreign Application Priority Data

Oct. 30, 2015 (GB) .................................. 1519223.0

(51) Int. Cl.
| | | |
|---|---|---|
| *G01M 17/013* | (2006.01) | |
| *G01K 13/00* | (2006.01) | |
| *G01D 11/24* | (2006.01) | |
| *B60R 16/027* | (2006.01) | |
| *G01D 21/00* | (2006.01) | |
| *B60C 23/04* | (2006.01) | |

(52) U.S. Cl.
CPC ....... *G01M 17/013* (2013.01); *B60C 23/0408* (2013.01); *B60R 16/027* (2013.01); *G01D 11/245* (2013.01); *G01D 21/00* (2013.01); *G01K 13/00* (2013.01); *B60B 2900/3316* (2013.01)

(58) Field of Classification Search
CPC .......................... G01M 17/013; B60C 23/0408
USPC ....................................... 73/115.07
See application file for complete search history.

(56) References Cited

U.S. PATENT DOCUMENTS

| | | |
|---|---|---|
| 5,552,759 A | 9/1996 | Stoyka |
| 5,959,365 A | 9/1999 | Mantini et al. |
| 6,286,992 B1 | 9/2001 | Kyrtsos |
| | (Continued) | |

FOREIGN PATENT DOCUMENTS

| | | |
|---|---|---|
| DE | 2134709 | 3/1973 |
| DE | 102009020358 | 12/2009 |
| | (Continued) | |

OTHER PUBLICATIONS

GB Search Report for corresponding GB Patent Application No. GB1519223.0 dated Apr. 11, 2016, 5 pages.
(Continued)

*Primary Examiner* — Eric S. McCall
*Assistant Examiner* — Timothy P Graves
(74) *Attorney, Agent, or Firm* — Lee & Hayes, P.C.

(57) ABSTRACT

A sensing device (200) for fitting at an inner surface of a wheel (222) and configured to abut a wheel hub (224) when the wheel (222) is fitted to a vehicle, the device (200) comprising: a movement sensor (602) for detecting movement of the device away from the wheel hub (224), the movement sensor (602) being located within a sensor housing (202); and a temperature sensor (606) configured to measure a temperature indicative of brake temperature.

20 Claims, 3 Drawing Sheets

(56) References Cited

U.S. PATENT DOCUMENTS

2013/0088346 A1*   4/2013   Broadfield ................ B60B 3/16
                                                                340/438
2014/0309860 A1*  10/2014   Paulin .................... B60B 3/165
                                                                 701/36

FOREIGN PATENT DOCUMENTS

| EP | 1527904 | 5/2005 |
|----|---------|--------|
| GB | 2289944 | 12/1995 |
| GB | 2474530 | 4/2011 |

OTHER PUBLICATIONS

PCT International Preliminary Report on Patentability for corresponding PCT International Application No. PCT/GB2016/053382 dated May 11, 2018, 14 pages.
PCT Search Report for corresponding International Application No. PCT/GB2016/053382 dated Apr. 19, 2017, 6 pages.

* cited by examiner

WHEEL SENSOR COOLING

RELATED APPLICATIONS

This application is a national stage application of an international patent application PCT/GB2016/053382, filed Oct. 31, 2016, which claims priority to GB Patent Application No. 1519223.0, filed on Oct. 30, 2015, entitled "Wheel Sensor Cooling," which applications are hereby incorporated by reference in their entirety.

TECHNICAL FIELD

The invention relates to wheel sensors. More specifically, the invention relates to, but need not be limited to, wheel sensors for placing against a hub of a vehicle wheel.

BACKGROUND

The use of sensors and systems for notifying when a wheel of a vehicle is not securely fitted to the vehicle improve safety. In certain applications, it may be desirable to place a sensing device comprising the sensor in a location in which it cannot be seen to a user or observer of a vehicle.

SUMMARY

The inventor has appreciated that certain applications may benefit from placing the sensing device in a recess in a wheel, such that the sensing device directly abuts a wheel hub when the wheel is fitted to a vehicle. However, in such arrangements the sensor is in close proximity to areas of the vehicle that may reach high temperatures under certain conditions, such as during braking. Normal operating temperatures for drum brakes can approach 200° C. The sensor may therefore be exposed to high temperatures, which may affect operation of the sensing device. Mitigating these conditions as much as possible is important ensure the temperature of the sensing device electronic components remain within their operational ranges.

It is noted that as used herein, the term "wheel hub" encompasses any part of a vehicle against which an internal surface of a wheel may abut.

According to an aspect of the invention, there is provided a sensing device for fitting at an inner surface of a wheel and configured to abut a wheel hub when the wheel is fitted to a vehicle, the device comprising: a movement sensor for detecting movement of the device away from the wheel hub, the movement sensor being located within a sensor housing, and at least one fin arranged on a surface of the sensor housing and configured to abut the wheel hub, such that the surface of the sensor housing is separated from the wheel hub. The separation of the sensor housing from the wheel hub, which may reach high temperatures, reduces heat conduction from the wheel hub to the sensor, ensuring that the operation of the sensor is not affected.

Optionally, the sensing device comprises a plurality of fins.

Optionally, the plurality of fins are angularly displaced relative to each other.

Optionally, the plurality of fins are equally spaced.

Optionally, the at least one fin extends radially.

Optionally, the radial extension of the at least one fin is linear.

Optionally, the radial extension of the at least one fin is curved.

Optionally, the at least one fin is configured to facilitate air movement across the surface of the sensor housing for cooling the sensing device when the wheel is rotating.

Optionally, each fin of the plurality of fins abuts the wheel hub.

Optionally, each of the plurality of fins is discrete.

Optionally, the sensor housing is configured to provide a poka-yoke fit within a recess in the wheel. Using a poka-yoke fit ensures that the device can only be inserted into the recess in the wheel in the correct orientation, in which the fins abut the wheel hub.

Optionally, the poka-yoke fit is provided by one or more of the fins.

Optionally, the poka-yoke fit is provided by one or more of the fins extending beyond a lateral limit of the device.

Optionally, the sensing device further comprises a temperature sensor for sensing a temperature indicative of a temperature of a vehicle's brakes. This allows sensing of irregularly high temperatures, which could be indicative of brake issues such as brake wear and fade.

Optionally, the temperature sensor is configured to trigger an alert when a threshold temperature is exceeded.

Optionally, the temperature sensor is configured to set the threshold based on normal operating temperatures.

Optionally, the temperature sensor further comprises a controller configured to monitor temperature over a period of time to determine the normal operating temperatures.

According to an aspect of the invention, there is provided a wheel comprising a recess for receiving a sensing device as discussed herein, the wheel comprising at least one air inlet configured to allow air to enter the recess when the wheel is fitted to a vehicle. This allows air to be moved across the surface of the sensor housing to cool the sensor.

Optionally, the wheel comprises a plurality of air inlets.

Optionally, the air inlets extend radially on the wheel from the recess.

According to an aspect of the invention, there is provided a vehicle comprising a wheel as discussed herein.

According to an aspect of the invention, there is provided a sensing device for fitting at an inner surface of a wheel and configured to abut a wheel hub when the wheel is fitted to a vehicle, the device comprising: a movement sensor for detecting movement of the device away from the wheel hub, the movement sensor being located within a sensor housing; and a temperature sensor configured to measure a temperature indicative of brake temperature.

Optionally, the sensing device further comprises a transmitter and the temperature sensor is further configured to control the transmitter to transmit an alert signal if the measured temperature exceeds a threshold.

Optionally, the temperature sensor may be configured to determine the threshold based on normal operating conditions of the temperature indicative of brake temperature.

Optionally, the temperature sensor may be configured to monitor the temperature indicative of brake temperature for a period of time and the monitored temperature may be used to determine the threshold.

Optionally, the temperature sensor may be configured to determine that the threshold is an average of the temperature indicative of brake temperature over the monitored time period.

Optionally, the sensing device wherein a first portion of the sensor housing comprises first and second electrical terminals exposed at an exterior of the first portion of the sensor housing, wherein the transmitter is configured to transmit a signal when the at least two electrical terminals are disconnected; and an electrically conductive element biased away from the at least two electrical terminals and configured to electrically connect the two electrical terminals when the bias is overcome.

Optionally, the sensing device further comprises at least one fin arranged on a surface of the sensor housing and configured to abut the wheel hub, such that the surface of the sensor housing is separated from the wheel hub. The sensing device may comprise a plurality of fins. The plurality of fins may comprise any of the features disclosed above or elsewhere herein.

BRIEF DESCRIPTION OF THE DRAWINGS

Exemplary embodiments of the invention are described herein with reference to the accompanying drawings, in which.

DETAILED DESCRIPTION

Generally disclosed herein are exemplary sensing devices for use in detecting the loosening of a wheel of a vehicle. Exemplary sensing devices are configured for placing within a recess of a wheel and against a hub of a vehicle wheel and to detect movement of the wheel away from the hub. Exemplary sensing devices are configured to mitigate the extent of heat transfer from areas of high temperature of a vehicle to the sensor electronics. Additionally, exemplary sensing devices may be configured to allow heat transfer from the sensor electronics when the vehicle is in operation and/or away from an area proximal to the sensor electronics and the wheel hub.

Figure 1:
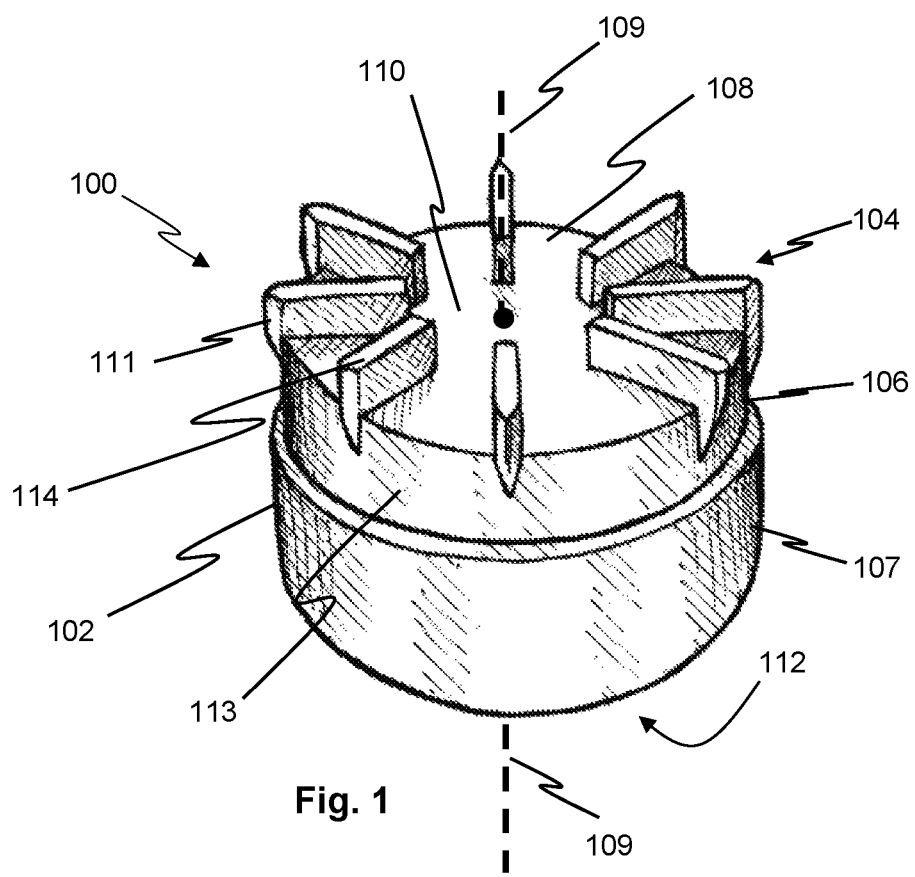
FIG. 1 is a perspective view of a sensing device.

FIG. 1 shows a sensing device 100 comprising a sensor housing 102 and a plurality of fins 104. The term 'sensor housing' is used throughout this document, but it should be understood that this term is not necessarily limited to housings providing complete encasement of the sensor. Exemplary sensor housings may leave one or more areas of the sensor electronics exposed. For example, the sensor housing 102 could comprise two plates located at opposed ends of the sensing device 100 shown in FIG. 1.

In the exemplary sensing device 100 of FIG. 1 the sensor housing 102 comprises a first portion 106 and a second portion 107. In the exemplary sensing device 100 of FIG. 1, the first portion 106 of the sensor housing 102 and the second portion 107 are cylindrical. The first portion 106 of the sensor housing 102 is of a smaller diameter than the second portion 107, and is telescopically received by the second portion 107. This arrangement allows relative movement of the first portion 106 of the sensor housing 102 with respect to the second portion 107 of the sensor housing 102. In alternate arrangements the second portion 107 of the sensor housing 102 may be of a smaller diameter than the first portion 106, such that the second portion 107 is telescopically received by the first portion 106. In further arrangements the first portion 106 and second portion 107 may be of equal diameter such that they sit flush and relative movement exposes some of the internal volume of the sensing device.

The first portion 106 of the sensor housing 102 comprises a vehicle face 108, and a cylindrical sidewall 113, although other shaped sidewalls, such as square and elliptical, for example, are also possible. The vehicle face 108 is a face of the sensor housing that faces a part of the vehicle (e.g. the wheel hub) when the sensing device is fitted to a wheel and the wheel is fitted to the vehicle. The second portion 107 comprises a wheel face 112. The wheel face 112 is a face of the sensor housing that faces, and may abut, the wheel.

Figure 2:
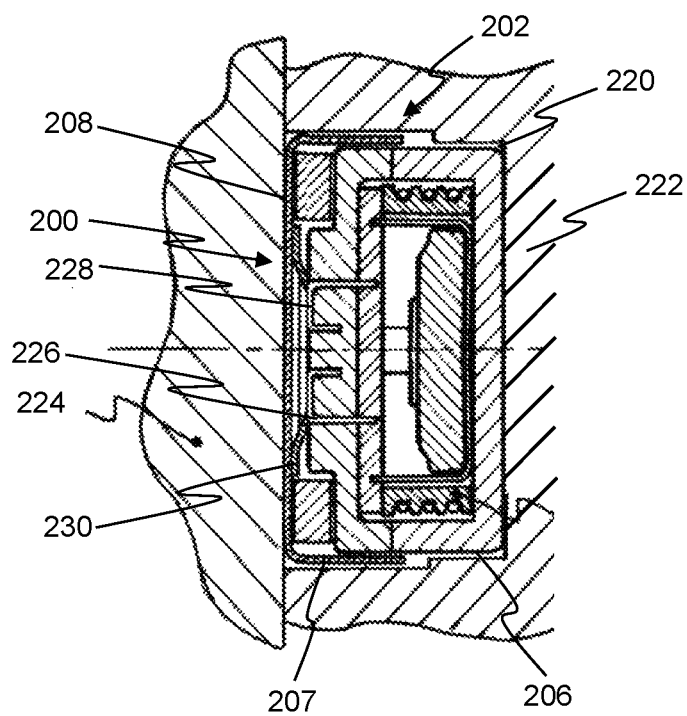
FIG. 2 is a section through a sensing device in open configuration.

FIG. 2 shows a section through an exemplary sensing device 200 comprising a sensor housing 202. The sensing device 200 is fitted within a recess 220 of a wheel 222. The wheel 222 is fitted to a vehicle such that the vehicle face 208 of the sensor housing 202 abuts a wheel hub 224. It is noted that the sensing device 200 does not include fins and FIG. 2 is included to show the operation of a sensing device more generally.

The first portion 206 of the sensor housing 202 comprises first and second electrical terminals 226, 228 exposed at an exterior of the first portion 206 of the sensor housing 202. The first and second electrical terminals 226, 228 pass through the first portion 206 of the sensor housing 202, such that they are electrically connected to electronics therein and provide electrical contact points that may be accessed externally to the first portion 206. In the exemplary sensing device 200 of FIG. 2, the first and second electrical terminals 226, 228 are each electrically connected to a circuit within the housing 202 and are separated from each other so as to form an open circuit.

The second portion 207 of the sensor housing 202 comprises an electrically conductive element 230 biased away from the first and second electrical terminals 226, 228. As such the second portion 207 of the sensor housing 202, is biased away from the first portion 206 of the sensor housing 202. The electrically conductive element 230 may be a spring, such as a disc spring. Contact of electrically conductive element 230 with electrical terminals 226 and 228 electrically connects electrical terminals 226 and 228.

The circuit within the sensor housing 202 is operable in two states. A first state when the first and second electrical terminals 226, 228 are electrically connected, and a second state when the first and second electrical terminals 226, 228 are electrically disconnected.

When the sensor housing 202 is in an open configuration, the first portion 206 of the sensor housing 202 is biased away from the second portion 207 of the sensor housing 202. As such, the electrically conductive element 230 is biased away from the first and second electrical terminals 226, 228 such that the electrically conductive element 230 is not in contact with at least one of the first and second electrical terminals 226, 228.

When the sensor housing 202 is in a closed configuration (as shown in FIG. 2), the bias acting on the electrically conductive element 230 is overcome and the electrically conductive element 230 is in contact with the first and second electrical terminals 226, 228 such that they are electrically connected.

Turning back to FIG. 1, a plurality of fins 104 is shown arranged on the vehicle face 108 of the first portion 106 of the sensor housing 102. The fins comprise an overhanging portion 111 and upper surface 114. The overhanging portion 111 extends beyond a lateral limit of the sensor housing 102. That is, if the fins 104 are considered to be on a top of the sensor housing 102 then a lateral limit of the sensor housing 102 is defined by the cylindrical shape of the first and second portions 106, 107. In the exemplary sensing device 100, the overhanging portion 111 extends beyond a lateral limit of the first portion 106.

It is noted that relative terms, such as top, bottom and lateral are used herein to aid description and need not be limiting on the scope of the invention.

The fins 104 extend radially across the vehicle face 108 of the first portion 106 of the sensor housing 102. In the exemplary sensing device 100 of FIG. 1, each fin extends radially from a non-central point on the vehicle face 108. That is, the fins 104 begin at a point radially inwards from the lateral limit of the first portion 106 and radially outwards from a centre of the vehicle face 108. As such, an open area 110 is formed in the central region of the vehicle face 108 of the sensing device 100. In this embodiment, the fins are therefore 'discrete' in that they are separate from each other. The term 'discrete' is used throughout this document to encompass a situation wherein individual fins do not intersect with one another or are not otherwise joined. In other embodiments individual fins may intersect with or otherwise join one or more of the other fins. In these embodiments there may be a restricted open area or no open area.

In the exemplary sensing device 100 of FIG. 1, the fins 104 extend to a point beyond the radial limit of the sensing device 100. The fins overhang the vehicle face 108 and the cylindrical wall 113 of the first portion 106 of the sensor housing 102, creating an overhanging portion 111. The projected area of a circle formed by the outer limit of the plurality of fins 104 is therefore of a greater diameter than a diameter of the first and second portions 106, 107 of the sensor housing 102.

In the exemplary sensing device 100, the plurality of fins 104 are angularly displaced on the vehicle face 108 of the first portion 106 about axis 109 passing vertically through the sensing device 100. That is, each pair of fins 104 has an angle therebetween. This arrangement exhibits radial symmetry about the central point of the vehicle face 108 in the exemplary sensing device 100 of FIG. 1. As such the circumferential spacing between each adjacent fin 104 is equal. The arrangement of fins 104 shown in FIG. 1 is not limiting and other arrangements are possible, such as non-uniform distribution of the fins 104. In arrangements the fins 104 may not show radial symmetry, and as such the spacing between each adjacent fin 104 may not be equal. In further embodiments the fins 104 may not be angularly displaced.

The upper surfaces (or vehicle surfaces) 114 of the fins 104 are uniform in height above the vehicle face 108. As such, the upper surfaces 114 present a uniform surface to the wheel hub and all abut the wheel hub. In other exemplary arrangements, the upper surfaces 114 of the fins 104 may have different heights. This may provide gaps between the wheel hub and one or more of the upper surfaces 114. These gaps allow increased airflow around the fins 104 and the vehicle surface 108.

In the exemplary sensing device 100 of FIG. 1, the radial extension of the fins is linear. That is, the fins are substantially straight in their radial extension.

It is noted that radial extension is not limited extension parallel to a radial line of the vehicle face 108. In exemplary arrangements, the fins 104 may extend at an angle to a radial line of the vehicle face 108. In particular exemplary arrangements, the fins 104 may extend in a direction of rotation of a wheel in which the sensing device 100 is fitted.

It is also noted that exemplary sensing devices may not have a circular vehicle face. In such arrangements, the fins may be considered to extend outwardly along a line drawn from a centre of the vehicle face.

Figure 3:
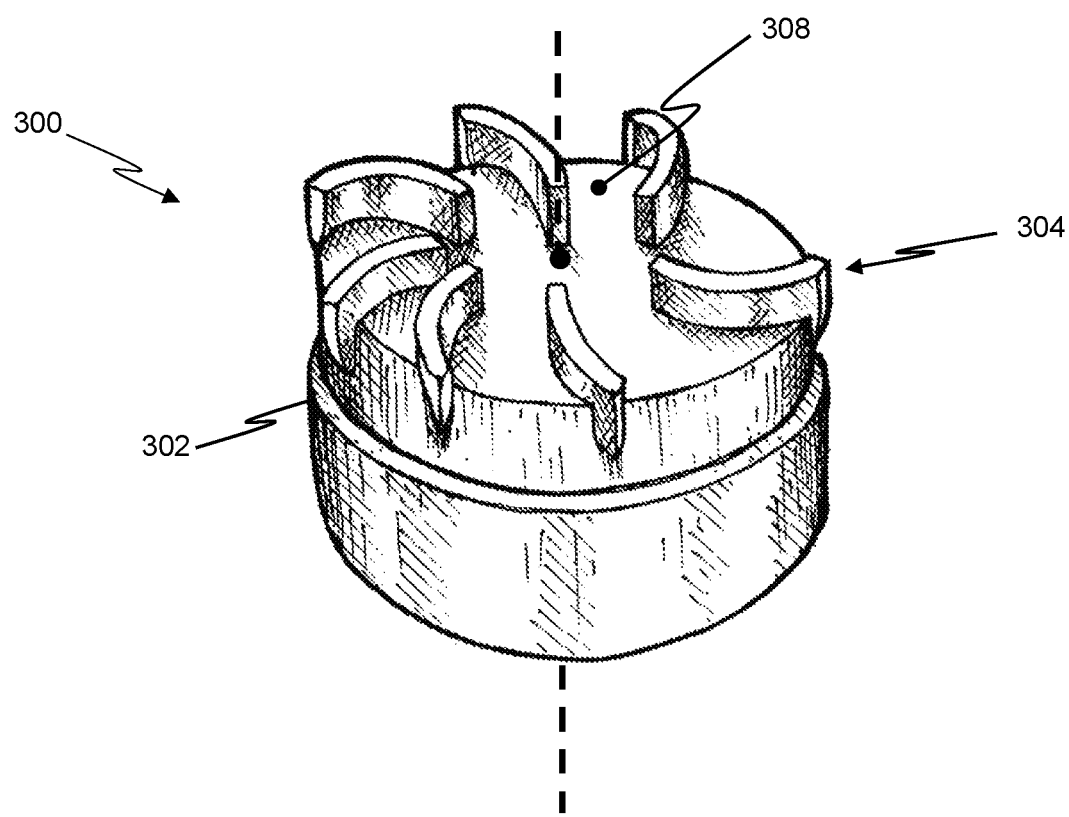
FIG. 3 is a perspective view of a sensing device.

Another exemplary sensing device 300 is shown in FIG. 3. A plurality of fins 304 shown in FIG. 3 exhibit a curved radial (or outward) extension. Note that the sensing device 300 of FIG. 3 differs from the sensing device 100 principally in the radial extension of the plurality of fins 304. As such, the same or similar features of FIG. 3 are given like reference signs to those used in FIG. 1 and a detailed description is not repeated. Many of the features of the sensing device 100 are also used in the sensing device 300, as will be understood by the skilled person.

The fins 304 are curved in a direction of rotation of a wheel to which the sensing device 300. That is, the curve of the fins 304 results in an end of each fin pointing, at least partly, in the direction of rotation. As described below, this arrangement acts like a fan and allows airflow around the vehicle face 308 of the sensor housing 302. The fins 304 may be angularly displaced. Further, the fins 304 may be uniformly angularly displaced.

Figure 4:
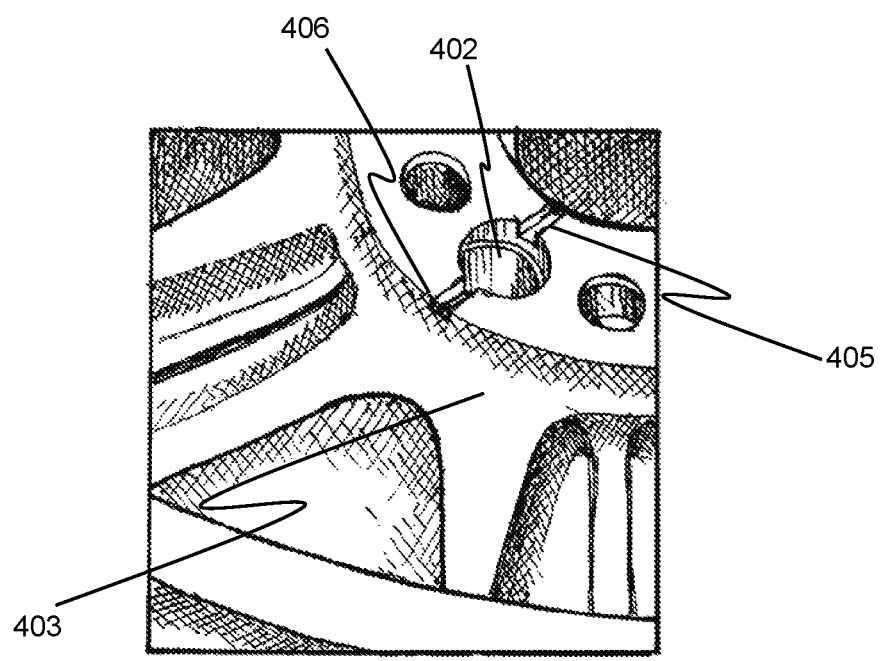
FIG. 4 is a perspective view of a wheel.
Figure 5:
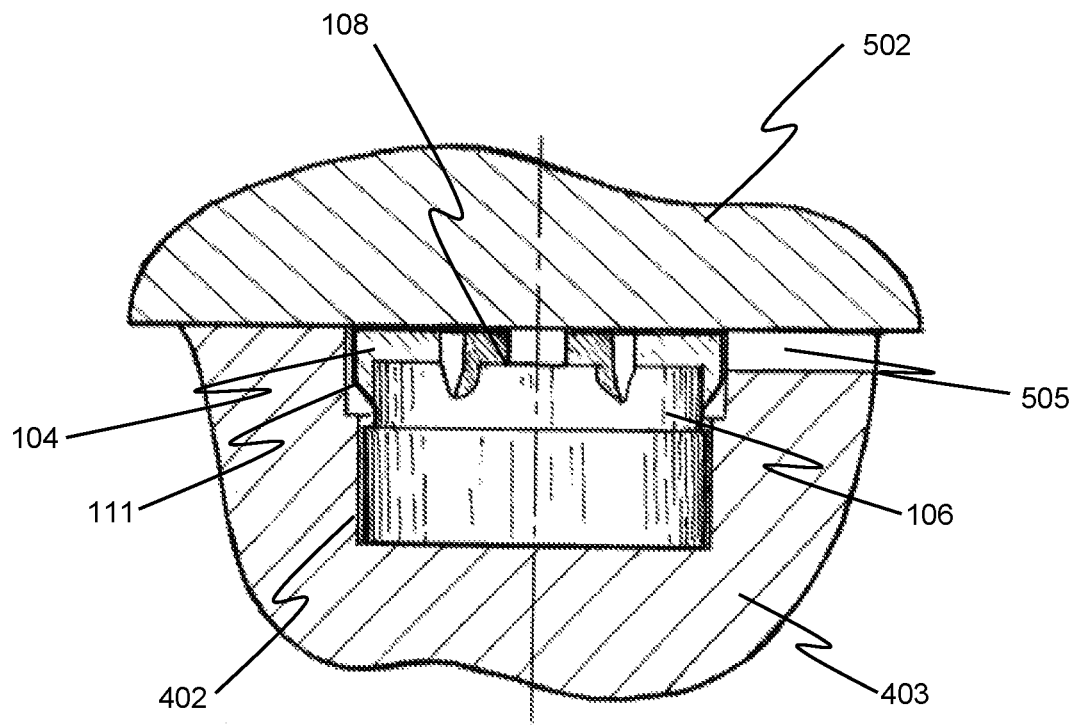
FIG. 5 is a section through a sensing device in closed configuration when mounted within a wheel which is affixed to a wheel hub.

Turning to FIG. 4, a wheel 403 is shown. A recess 402 has been machined into the wheel 403 to allow insertion of exemplary sensing devices 100, 300 into the wheel 403. Two air channels 405, 406 have been machined into the wheel 403. When the wheel 403 is affixed to the wheel hub 502, the machined air channels 405, 406 form air inlets 505, as shown in FIG. 5. The air inlets 505 are formed between the wheel hub and the internal walls of the channels 405, 406. The channels extend radially, with respect to the wheel 403. Radial extension may include extension at an angle of a radial line of the wheel. For example, the channels 405, 406 may radially extend in a direction of rotation of the wheel 403. It is noted that the direction of rotation of the wheel, as mentioned herein, typically means the direction of most common rotation. In the case of most vehicles, this is would result in forward motion of the vehicle.

FIG. 5 shows a sensing device 100 mounted within the recess 402. The position of the sensing device 100 shown in FIG. 5 puts the sensor in close proximity to areas of the vehicle that may reach high temperatures under certain conditions. In order to mitigate these conditions, the sensor housing 102 is separated from a wheel hub 502 by the plurality of fins 104. This reduces the heat conduction to the sensor housing 102 from the wheel hub 502, and therefore reduces the heat conduction to the sensor electronics.

The shape of sensing device 100 and the machined recess 402 is such that the sensing device 100 can only be inserted within the recess in one orientation. In the exemplary sensing device 100 this poka-yoke fit is provided by the overhanging portion 111 of the fins 104. Since the diameter of a circle formed by the outer limits of the fins 104 is greater than the diameter of the sensor housing 102, the sensing device 100 could not be inserted into the recess 402 upside down. In other embodiments the poka-yoke fit may be provided by the shape of the sensor housing 102, or by only one of the plurality of fins 104. A keying arrangement may also be used to ensure that the channel 505 is not blocked or partially blocked by a fin 104.

The wheel 403, within which the sensing device 100 is mounted, is affixed to a wheel hub 502. Each fin 104 is of equal height such the upper surface of each fin abuts the wheel hub 502. As such, the vehicle face 108 of the first portion 106 is separated from the wheel hub 502. It is not necessary for all fins 104 to be the same height. The separation of the upper face 108 from the wheel hub could be provided by only one fin while the other fins could be of a lesser height.

When the wheel 403 is securely fixed to the wheel hub 502, as shown in FIG. 5, the wheel 403 sits flush with the wheel hub 502. In FIG. 5, the sensing device 100 is held in the closed configuration by the secure connection of the wheel 403 to the wheel hub 502 by one or more of the wheel nuts (not shown). The recess height is such that when there is a secure connection between the wheel 403 and wheel hub 502, the sensing device 100 is in a closed position.

When the vehicle is in operation, air may enter into the recess 402 via the air inlet 505. Although the term 'air inlet' is used throughout this document, it should be understood that air may also exit the recess 402 through the air "inlet" 505. The term 'air inlet' therefore does not limit to entry of air into the recess 402. If a plurality of air inlets are machined into the wheel 403, the orientation of each individual air inlet with respect to the tangential direction of motion of the wheel 403 will vary as the wheel 403 rotates. Depending on the instantaneous position of the sensing device 100, the same 'air inlet' could serve either to allow air to enter the recess 402, or allow air to leave to the recess 402.

Once air has entered into the recess 402, the shaping of the fins 104 promote (or cause) movement of the air over the upper face 108 of the sensor housing 102 as the wheel 403 rotates. The movement of the air over the upper face 108 of the first portion of the sensor housing 106 cools of the sensor housing.

In exemplary arrangements, the sensing device 100, 200, 300 may also include a temperature sensor. As the sensing device 100, 200, 300 is in close proximity to the wheel hub 502 and, therefore, the brakes of the vehicle, the temperature sensor is configured to measure a temperature indicative of brake temperature. The temperature measured may be proportional to the brake temperature.

Figure 6:
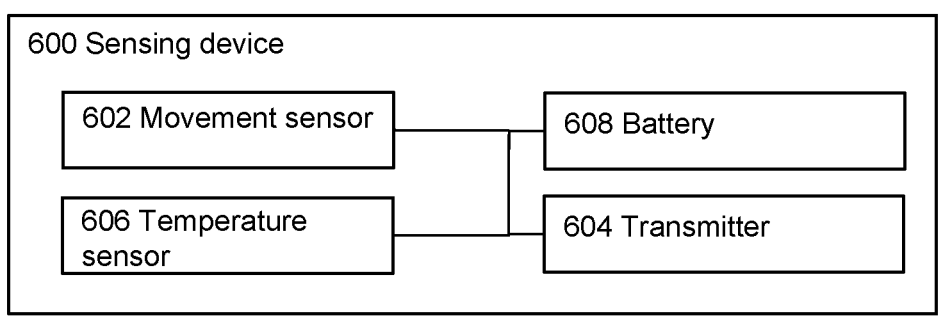
FIG. 6 is a schematic diagram of a sensing device.

FIG. 6 shows a block schematic of an exemplary sensing device 600. The sensing device 600 may be the sensing device 100, 200 or 300. That is, each of those sensing devices may comprise the features of the sensing device 600. The sensing device 600 comprises a movement sensor 602 and transmitter 604 configured to sense movement of the sensing device 600 away from the wheel, as described above. The sensing device 600 also comprises a temperature sensor 606 configured to measure a temperature indicative of brake temperature. A battery 608 may be included to provide electrical power to the sensing device 600.

The temperature sensor 606 may be configured to control the transmitter 604 to transmit an alert signal if the measured temperature exceeds a threshold. The threshold may be pre-programmed into the sensing device 600. Alternatively, or in a addition, the temperature sensor 606 may be configured to determine the threshold based on normal operating conditions. In exemplary sensing devices 600, the temperature sensor 606 may be configured to monitor a temperature indicative of brake temperature for a period of time and the monitored temperature may be used to determine the threshold. For example, an average temperature, or some other statistically derived value based on the monitored temperature, over time may be the threshold value. The temperature sensor may be a PWB mounted IC chip or similar.

The skilled person will be able to envisage further embodiments without departing from the scope of the appended claims.

The invention claimed is:

1. A wheel comprising a recess within which a sensing device is located, the sensing device configured to abut a wheel hub when the wheel is fitted to a vehicle, the sensing device comprising:
    a movement sensor for detecting movement of the sensing device away from the wheel hub, the movement sensor being located within a sensor housing;
    a temperature sensor configured to measure a temperature indicative of brake temperature; and
    at least one air channel configured to allow air to enter the recess when the wheel is fitted to a vehicle.

2. A wheel according to claim 1, wherein the sensing device further comprises a transmitter, and wherein the temperature sensor is further configured to control the transmitter to transmit an alert signal if the measured temperature exceeds a threshold.

3. A wheel according to claim 2, wherein the temperature sensor is configured to determine a value of the threshold based on normal operating conditions of the temperature indicative of brake temperature.

4. A wheel according to claim 3, wherein the temperature sensor is configured to monitor the temperature indicative of brake temperature for a period of time and the monitored temperature may be used to determine the value of the threshold.

5. A wheel according to claim 4, wherein the temperature sensor is configured to determine that the value of the threshold is an average of the temperature indicative of brake temperature over the monitored time period.

6. A wheel according claim 2, wherein a first portion of the sensor housing comprises first and second electrical terminals exposed at an exterior of the first portion of the sensor housing, and wherein the transmitter is configured to transmit a signal when the at least two electrical terminals are disconnected,
    the sensing device further comprising an electrically conductive element biased away from the at least two electrical terminals and configured to electrically connect the two electrical terminals when the bias is overcome.

7. A wheel according to claim 1, wherein the sensing device further comprises at least one fin arranged on a surface of the sensor housing and configured to abut the wheel hub, such that the surface of the sensor housing is separated from the wheel hub.

8. A wheel according to claim 7, wherein the sensing device comprises a plurality of fins.

9. A wheel according to claim 8, wherein the plurality of fins are angularly displaced relative to each other.

10. A wheel according to claim 8, wherein the plurality of fins are equally spaced.

11. A wheel according to claim 7, wherein the at least one fin extends radially.

12. A wheel according to claim 11, wherein the radial extension of the at least one fin is linear.

13. A wheel according to claim 11, wherein the radial extension of the at least one fin is curved.

14. A wheel according claim 7, wherein the at least one fin is configured to facilitate air movement across the surface of the sensor housing for cooling the sensing device when the wheel is rotating.

15. A vehicle comprising a wheel according to claim 1.

16. A wheel according to claim 1, wherein the at least one air channel extends radially on the wheel from the recess.

17. A wheel according to claim 1, comprising a plurality of air channels.

18. A wheel according to claim 1, wherein the sensing device and the recess are shaped such that the sensing device can only be received within the recess in one orientation.

19. A wheel according to claim 6, wherein the recess height is such that when the wheel is securely connected to the wheel hub, the first and second electrical terminals are electrically connected.

20. A wheel comprising a recess within which a sensing device is located, the sensing device configured to abut a wheel hub when the wheel is fitted to a vehicle, the sensing device comprising:
- a movement sensor for detecting movement of the sensing device away from the wheel hub, the movement sensor being located within a sensor housing;
- a temperature sensor configured to measure a temperature indicative of brake temperature; and
- at least one fin arranged on a surface of the sensor housing and configured to abut the wheel hub, such that the surface of the sensor housing is separated from the wheel hub.

* * * * *